United States Patent Office 3,053,910
Patented Sept. 11, 1962

3,053,910
METHOD OF MANUFACTURING ALKYL IODIDES
Frederic R. Huber, Mahwah, and Leslie M. Schenck, Mountainside, N.J., assignors to General Aniline & Film Corporation, New York, N.Y., a corporation of Delaware
No Drawing. Filed Oct. 7, 1960, Ser. No. 61,106
6 Claims. (Cl. 260—652)

This invention relates to an improved method for the manufacture of alkyl iodides on a commercial scale in a practical and most economical manner.

The synthesis of alkyl iodides is not new to the art. Dumas and Peligot, Ann. 15, 20 (1835), first reported the preparation of methyl iodide by the reaction of an alcohol with phosphorus and iodine. A furtherance of their early work is reported by Ipatieu, J. Russ. Phys. Chem. Soc. 27 I, 364 (1895); Crisner, 717 (1892); and Walker and Johnson, J. Chem. Soc. 87, 1592 (1905). Adams and Voorhees, J. Am. Chem. Soc. 41, 789–98 (1919), improved upon the red phosphorus-yellow phosphorus-alcohol iodine synthesis of Walker, and by equipment modification were able to prepare larger amounts of the several lower alkyl iodides in yields of 90–100% of the theoretical.

Hunt, J. Chem. Soc. 177, 1592–4 (1920), verified the work of Beilstein and Rieth, Ann. 126, 250 (1863), that one atom of phosphorus reduces five atoms of iodine instead of the assumed three atoms reported in much of the earlier work. As late as 1931, Hirao, J. Chem. Soc. Japan 52, 269–70 (1931) disclosed a more rapid method of converting an alcohol, phosphorus and iodine to an alkyl halide in 90% yield.

In addition to the classical phosphorus and iodine synthesis of alkyl iodides, given in excellent detail by King in Organic Synthesis, Collective Vol. II, pp. 399–404, John Wiley and Sons, Inc., Weinland and Schmidt, German Patent 175,209, describe the preparation of methyl iodide and ethyl iodide by reacting dimethylsulfate with an aqueous solution of potassium iodide in the following manner:

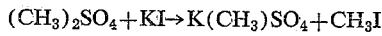

$$(CH_3)_2SO_4 + KI \rightarrow K(CH_3)SO_4 + CH_3I$$

Peacock and Menon, Quart. J. Indian Chem. Soc. 2, 240 (1925), employed a similar approach by converting the methyl and ethyl esters of p-toluenesulfonic acid to the corresponding alkyl iodides with potassium iodide in 84.5 and 66.6% yields, respectively. This work was substantiated by Rodionov, Bull. Soc. Chem. 39, 305–25 (1926).

In two works, Jones and Green, J. Chem. Soc. 1926, 270; J. Chem. Soc. 1927, 928, report the reaction of aluminum with three atoms of iodine, with hydrolysis of the aluminum tri-iodide in the presence of an alcohol and water to produce the corresponding alkyl iodide. These workers state aluminum can advantageously be used instead of phosphorus in the synthesis.

To avoid the use of phosphorus, an element of pyrophoric nature, numerous workers have since devised methods for synthesis of alkyl iodides which, although expensive and cumbersome in operation, eliminate the hazards encountered in using phosphorus as an intermediate chemical. Kimball, J. Chem. Education 10, 747 (1933) reacted iodoform with potassium hydroxide in 95% ethanol, distilled off the ethanol solvent, acidified the resultant mixture prior to filtering, and then rendered the filtrate alkaline with sodium hydroxide followed by heating with commercial dimethylsulfate to obtain methyl iodide in 78% yield. To obtain ethyl iodide in 80% yield, Kimball teaches heating the alkaline filtrate described above with commercial diethylsulfate.

Dangyan, J. Chem. Gen. (USSR) 10, 1668–9 (1940), obtained methyl iodide in 50.3% yield by heating methanol with iodine and iron, ethyl iodide in 96% yield by fusing ethylacetate with iodine in the presence of iron.

In a later work, Dangyn, J. Gen. Chem. (USSR) 11, 314–18; 11, 616–18 (1941), describes the utilization of aluminum and ethylacetate with iodine at 110–210° C. to form ethyl iodide, and magnesium, iodine, and methylbenzoate to synthesize methyl iodide in 70–90% of theoretical yield. Dangyan further teaches that the reaction of aluminum, alcohol, and iodine to form alkyl iodides is an excellent method of preparation, but that extreme caution is required during the heating period of the synthesis.

Landover and Rydon, J. Chem. Soc. 1953, 2224–34, report the preparation of ethyl iodide in 62% yield by the distillation of ethanol from silver iodide. In British Patent 695,648 of July 12, 1953, Landover and Rydon demonstrate a method for the synthesis of alkyl iodides whereby an alkyl, aryl or alkyl-aryl phosphate is heated with an alkyl halide and an alcohol to obtain an alkyl exchange of 77% in the case of ethyl alcohol. De Postes, Compt. Rend. 223, 681–2 (1946), proposes the preparation of methyl iodide by the introduction of gaseous hydrogen chloride at 20° C. into a mixture of zinc, methanol and iodine.

Still other methods of preparation, Norris, Am. Chem. J. 38, 639 (1907), utilized the slow distillation of methanol from an excess of constant boiling hydriodic acid to form methyl iodide, and Peacock and Menon, Quart. J. Indian Chem. Soc. 2, 240 (1925), and Rodionov, Bull. Soc. Chem. (4) 39, 323 (1926), resorted to the electrolysis of aqueous potassium iodide in the presence of methyl p-toluene-sulfonate.

Commercially, the alkyl iodides, and more specifically, methyl iodide and ethyl iodide, are produced by either the reaction of the corresponding alcohol with phosphorus and iodine, or by the reaction of a dialkylsulfate on a solution of sodium or potassium iodide. It is of especial interest that in the latter reaction, as described by Hartman, Organic Synthesis, Collective Vol. II, p. 404, John Wiley and Sons, calcium carbonate is added to the mixture to insure a neutral or alkaline condition throughout the course of the reaction. To those skilled in the art, the inherent danger in commercial production of alkyl iodide by the use of phosphorus and iodine is quite obvious. Partington, Textbook of Inorganic Chemistry, Sixth Edition, Macmillan and Company, Ltd., pp. 566–567, states: "A characteristic property of white phosphorus is the ease with which it undergoes spontaneous oxidation when exposed to air at the ordinary temperature, accompanied by a green glow of phosphorescence. If warmed to about 50° it inflames in dry air and burns with a white flame, forming white fumes of the pentoxide $P_2O_5$. It inflames spontaneously in chlorine, explodes violently in contact with liquid bromine, and inflames in contact with solid iodine." Furthermore, Partington discloses the so-called red-phosphorus of commerce contains about 0.5% of white phosphorus, from which it is prepared.

A recent commercial manufacture involves the reduction of iodine in situ by an aqueous solution of a sulfurous acid derivative followed by the reaction of an appropriate dialkyl ester of sulfuric acid with the hydriodic acid thus formed. This reaction, which is more fully described in our United States Patent 2,899,471, is on a commercial scale, somewhat troublesome in that a copious amount of sulfur dioxide is involved and that a large excess of reducing agent must be maintained at all times in order to repress the subsequent reduction of sulfuric acid by hydriodic acid to elemental sulfur, sulfur dioxide and hydrogen sulfide.

It is an object of the present invention to provide an improved method of preparing alkyl iodides while avoiding the shortcomings and inherent dangers accompanying the foregoing methods.

A further object is to provide a method in which alkyl iodides can be prepared in excellent yields while keeping chemical consumption at a minimum and utilizing only the most basic raw materials with the attendant advantage of a most economical process.

Other objects and advantages will become more clearly evident from the following specification.

We have discovered that alkyl iodides can be readily and economically manufactured at low cost without resorting to the use of the expensive alkali metal salts, which in themselves are an art to prepare, and without any inherent dangers or inconveniences of former methods. Quite contrary to prior art teachings, we have further discovered that alkyl iodides are readily prepared through the reaction of a dialkyl sulfate at a pH of 1 to 6.5 with an iodide prepared by the action of a reducing agent, as will be henceforth described, on an aqueous slurry of elemental iodine.

Moeller, "Inorganic Chemistry," John Wiley & Sons, New York, N.Y. (1952), pages 418–421 (Table 13–2) states that halogens are reduced by a number of metals and non-metals. This metathetical reaction takes place between the elements in the absence of water. Moeller later states, however, that much of the chemistry of the halogens is centered in their behaviors in aqueous solutions, and that two important reactions may occur with water, namely:

$$X_2 + H_2O \rightleftharpoons 2H^+ + 2X^- + \tfrac{1}{2}O_2 \quad (1)$$

$$X_2 + H_2O \rightleftharpoons H^+ + X^- + HOX \quad (2)$$

In our invention, we are concerned with forcing the equilibrium to the right in the first of the above equations, and in maintaining a sufficient concentration of hydrogen ion in the second equation to provide iodide ion rather than HOX for later conversion to the alkyl halide. These conditions can be best considered by the following series of reactions:

$$I_2 + H_2O \rightarrow 2H^+ + 2I^- + \tfrac{1}{2}(O)_2 \quad (3)$$

$$A \text{ (Reducing Agent)} + \tfrac{1}{2}O_2 \rightarrow AO \quad (4)$$

the reducing agent performing the function of removing the oxygen from equilibrium with the H+ and I−, thereby providing the conditions necessary for the practice of our invention. The formation of an alkyl iodide is completed by the addition of dialkylsulfate as shown in the following reaction:

$$H^+ + I^- + (RO)_2SO_2 \rightarrow RI + SO_3OR^- + H^+ \quad (5)$$

wherein A in the above series represents a reducing agent selected from the following classes:

*Class 1.*—Metals, such as lithium, sodium, potassium, iron, nickel, zinc, aluminum, silicon, chromium, cadmium, cobalt, tin, calcium, barium, strontium, etc.

*Class 2.*—Salts or oxides of meta stable valences of metals, such as for example, stannous sulfate, antimonous sulfate, sodium meta antimonite, sodium arsenite, antimony trioxide, arsenic trioxide, vanadium tetra-oxide, alkaline hydrogen peroxide, etc.

*Class 3.*—Organic acids, such as oxalic acid, formic acid, thioacetic acid and to a lesser degree pyruvic acid, and the alkali and alkaline earth metal salts thereof, i.e., lithium, sodium, potassium, etc.

*Class 4.*—Inorganic acids, such as for example, hydrosulfuric acid, hypophosphorous acid, phosphorous acid and the like, and their alkali and alkaline earth metal salts thereof, i.e., lithium, sodium, potassium, etc.

*Class 5.*—Organic bases, such as hydrazine, phenyl hydrazine, hydroxylamine, etc.

*Class 6.*—Organic reducing agents, such as aldose sugars, xyloses, aldehydes, such as acetaldehyde and the like.

*Class 7.*—Miscellaneous reducing agents, such as for example, hydrogen, nitrides, azides, oximes and the like. and R represents an alkyl radical of from 1 to 5 carbon atoms, such as for example, methyl, ethyl, propyl, isopropyl, n-butyl, isobutyl, amyl, etc.

From the foregoing classes no difficulty will be encountered by those skilled in the art to select a reductant that may be employed in the aforementioned amount to reduce, in the reaction of the process, elemental iodine to iodide ion.

As illustrative examples of alkyl diesters of sulfuric acid, the following are given:

dimethyl sulfate
diethyl sulfate
dipropyl sulfate
dibutyl sulfate
diamyl sulfate In reducing the foregoing reactions to practice, 1 mole of elemental iodine is added to a sufficient amount of water, about 1–10 parts by weight of water per 1 part by weight of iodine, to form a slurry. To the slurry is then added over a period of 2–3 hours, with agitation or stirring, any one of the aforementioned metals, metal salts, acids, bases and the like (1.0 to 1.3 moles per mole of elemental iodine at a temperature ranging between 20–60° C.) until the iodine color of the slurry disappears. The completely or partially colorless slurry, in the case where metal is employed as a reducing agent, or a solution, in the case where a metal salt, acid, base and the like is employed, is heated to a temperature of 70–80° C. and to it added dropwise over a period of 1–2 hours 1.2 moles of a dialkyl sulfate followed by distillation of the iodo alkane as it is formed. When the dialkyl sulfate addition is complete, the reaction mixture is heated to 95° C. to complete the product distillation. The product is washed with cold water and dilute alkali, such as sodium carbonate, sodium bicarbonate and the like in aqueous solution ranging from 1% to 10% concentration. The resulting product then may be dried over anhydrous calcium chloride, potassium sulfate, sodium sulfate or any one of the conventionally employed drying agents. The yield of the alkyl iodide ranges between 90% and 100% of the theoretical.

In connection with the foregoing procedural steps, it will be obvious to those skilled in the art that although we prefer the convenience of operating at normal atmospheric pressure within the temperature ranges described, lower temperatures are permissible if the operation is conducted at subatmospheric pressures and increased temperatures may be advantageous when operating at elevated pressures.

By operating at pH levels of 1 to 6.5 under our reaction conditions at the aforementioned temperature range, we are able to produce in essentially quantitative yield the corresponding alkyl iodide. Our process therefore eliminates the need of expensive salts of iodine and no by-products formed which require a specialized disposal technique.

The following examples will illustrate more clearly the procedure to be employed in the preparation of alkyl iodides in accordance with our improved process.

*Example 1*

Into a five liter 4-necked flask equipped with an efficient agitator, thermometer, dropping funnel and condenser set for distillation, there were charged 820 grams of water and 1050 grams (4.14 moles) of commercial iodine. Over a period of 2–3 hours at a temperature ranging between 20–60° C. there were added 241 grams (4.3 moles) of iron powder. The colorless slurry which has a pH of 5.3 was heated to 70–80° C. and to it added dropwise over a period of 1–2 hours, 1540 grams of diethyl sulfate (10 moles) while distilling off the iodoethane as it was formed. When the diethyl sulfate addition was complete, the reaction mixture was heated to 95° C. to complete the product distillation, the product washed with cold water and 5% aqueous sodium carbonate solution, and dried over anhydrous calcium chloride. The yield of the ethyl iodide amounted to 1280 grams which analyzed as 99% iodoethane by iodine analysis.

*Example II*

Example I was repeated with the exception that 241 grams of iron powder were replaced by 252 grams (4.3 moles) of nickel powder. The yield of the product amounted to 1215 grams which analyzed as 99.2% iodoethane by iodine analysis.

*Example III*

Example I was repeated with the exception that 241 grams of iron powder were replaced by 281 grams (4.3 moles) of zinc powder. The yield of the product amounted to 1287 grams which analyzed as 98.7% iodoethane by iodine analysis.

*Example IV*

Example I was repeated with the exception that 241 grams of iron powder were replaced by 78 grams (2.87 moles) of aluminum powder. The yield of the product amounted to 1256 grams which analyzed as 99.0% iodoethane by iodine analysis.

*Example V*

Example I was repeated with the exception that 241 grams of iron powder were replaced by 60.5 grams (2.15 moles) of silicon. The yield of the product amounted to 1165 grams of ethyl iodide which analyzed as 98.2% iodoethane by iodine analysis.

*Example VI*

Example I was repeated with the exception that 241 grams of iron powder were replaced by 292 grams (4.3 moles) of sodium formate. The yield of the product amounted to 1272 grams of ethyl iodide which analyzed as 99.3% iodoethane by iodine analysis.

*Example VII*

Example I was repeated with the exception that 241 grams of iron powder were replaced by 146 grams (4.3 moles) of hydrogen sulfide. The yield of the product amounted to 1205 grams of ethyl iodide which analyzed as 99.2% iodoethane by iodine analysis.

*Example VIII*

Example I was repeated with the exception that 241 grams of iron powder were replaced by 352 grams (4.3 moles) of phosphorous acid. The yield of the product amounted to 1198 grams of ethyl iodide which analyzed as 98.6% iodoethane by iodine analysis.

*Example IX*

Example I was repeated with the exception that 241 grams of iron powder were replaced by 473 grams (4.3 moles) of sodium hypophosphite. The yield of the product amounted to 1104 grams of ethyl iodide which analyzed as 97.5% iodoethane by iodine analysis.

*Example X*

Example I was repeated with the exception that 1540 grams of diethyl sulfate were replaced by 1260 grams (10 moles) of dimethyl sulfate. The yield of the product amounted to 1147 grams of methyl iodide which analyzed as 99.1% iodomethane by iodine analysis.

*Example XI*

Example I was repeated with the exception that 1540 grams of diethyl sulfate were replaced by 1920 grams (10 moles) of di-n-propyl sulfate. The yield of the product amounted to 1326 grams which analyzed as 97.2% n-propyl iodide by iodine analysis.

*Example XII*

Example I was again repeated with the exception that 1540 grams of diethyl sulfate were replaced by 2100 grams (10 moles) of di-n-butyl sulfate. The yield of the product amounted to 1360 grams which analyzed as 98.9% n-butyl iodide.

*Example XIII*

Example I was again repeated with the exception that 1540 grams of diethyl sulfate were replaced by 2380 grams (10 moles) of di-n-amyl sulfate. The yield of the product amounted to 1440 grams which analyzed as 99.4% n-amyl iodide by iodine analysis.

*Example XIV*

Example I was again repeated with the exception that 241 grams of iron powder were replaced by 408 grams (4.54 moles) of oxalic acid. The yield of the product amounted to 1197 grams of ethyl iodide which analyzed as 99.4% iodoethane by iodine analysis.

This application is a continuation-in-part of our application Serial No. 805,654, filed on April 13, 1959, and now abandoned.

We claim:

1. The process of preparing alkyl iodides which comprises reacting a molar amount of a dialkyl sulfate in which the alkyl contains from 1 to 5 carbon atoms and at a pH of 1 to 6.5 and a temperature of 70–95° C. with an aqueous system consisting of an equivalent molar amount of the iodide ion formed from, and in equilibrium with, an aqueous elemental iodine slurry in the presence of a compound having a reduction-oxidation potential greater than that of the elemental oxygen formed by the reaction of the water with elemental iodine.

2. The process of preparing alkyl iodine which comprises reacting 1 mole of a dialkyl sulfate in which the alkyl contains from 1 to 5 carbon atoms and at a pH of 1 to 6.5 and at a temperature of 70–95° C. with an aqueous system consisting of 1 mole of the iodide ion formed from, and in equilibrium with, an aqueous elemental iodine slurry in the presence of iron powder.

3. The process of preparing alkyl iodine which comprises reacting 1 mole of a dialkyl sulfate in which the alkyl contains from 1 to 5 carbon atoms and at a pH of 1 to 6.5 and at a temperature of 70–95° C. with an aqueous system consisting of 1 mole of the iodide ion formed from, and in equilibrium with, an aqueous elemental iodine slurry in the presence of nickel powder.

4. The process of preparing alkyl iodine which comprises reacting 1 mole of a dialkyl sulfate in which the alkyl contains from 1 to 5 carbon atoms and at a pH of 1 to 6.5 and at a temperature of 70–95° C. with an aqueous system consisting of 1 mole of the iodide ion formed from, and in equilibrium with, an aqueous elemental iodine slurry in the presence of zinc powder.

5. The process of preparing alkyl iodine which comprises reacting 1 mole of a dialkyl sulfate in which the alkyl contains from 1 to 5 carbon atoms and at a pH of 1 to 6.5 and at a temperature of 70–95° C. with an aqueous system consisting of 1 mole of the iodide ion formed from, and in equilibrium with, an aqueous elemental iodine slurry in the presence of aluminum powder.

6. The process of preparing alkyl iodine which comprises reacting 1 mole of a dialkyl sulfate in which the alkyl contains from 1 to 5 carbon atoms and at a pH of 1 to 6.5 and at a temperature of 70–95° C. with an aqueous system consisting of 1 mole of the iodide ion formed from, and in equilibrium with, an aqueous elemental iodine slurry in the presence of silica powder.

References Cited in the file of this patent

FOREIGN PATENTS 175,209    Germany _____ Sept. 14, 1906

OTHER REFERENCES

Moeller, Inorganic Chemistry, John Wiley and Sons, New York, N.Y., pages 418–421.